US008550352B2

United States Patent
Guo et al.

(10) Patent No.: US 8,550,352 B2
(45) Date of Patent: *Oct. 8, 2013

(54) QR BARCODE DECODING CHIP AND DECODING METHOD THEREOF

(75) Inventors: Dong Guo, Fuzhou (CN); Rongsheng Liu, Fuzhou (CN); Xianfu Wang, Fuzhou (CN); Fusheng Lan, Fuzhou (CN)

(73) Assignee: Fujian Newland Computer Co., Ltd., Fuzhou, Fujian Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/149,842

(22) Filed: May 31, 2011

(65) Prior Publication Data

US 2011/0290879 A1 Dec. 1, 2011

(30) Foreign Application Priority Data

Jun. 1, 2010 (CN) .......................... 2010 1 0189802

(51) Int. Cl.
*G06K 7/10* (2006.01)
*G06K 9/36* (2006.01)
*G06K 9/80* (2006.01)

(52) U.S. Cl.
USPC .................................... 235/462.1

(58) Field of Classification Search
USPC ............... 235/462.01, 462.07, 462.09, 462.1, 235/462.15, 462.25, 454, 439, 440
See application file for complete search history.

(56) References Cited

U.S. PATENT DOCUMENTS

| | | | | |
|---|---|---|---|---|
| 7,946,491 B2 * | 5/2011 | Burian et al. | ............ | 235/462.07 |
| 8,326,037 B1 * | 12/2012 | Abitz et al. | .................. | 382/181 |
| 2004/0020989 A1 * | 2/2004 | Muramatsu | ............... | 235/462.1 |
| 2010/0327066 A1 * | 12/2010 | Khan | ....................... | 235/462.01 |
| 2011/0290877 A1 * | 12/2011 | Sun et al. | ...................... | 235/436 |
| 2011/0290878 A1 * | 12/2011 | Sun et al. | ...................... | 235/437 |
| 2011/0290880 A1 * | 12/2011 | Cai et al. | ...................... | 235/437 |

* cited by examiner

Primary Examiner — Michael G Lee
Assistant Examiner — Suezu Ellis
(74) Attorney, Agent, or Firm — Cheng-Ju Chiang (57) ABSTRACT

An exemplary QR barcode decoding chip includes a characteristic searching unit configured for searching for a characteristic pattern in the barcode image to determine pixel coordinates of the characteristic pattern; a barcode parameter acquiring unit configured for acquiring a barcode parameter according to the pixel coordinates of the characteristic pattern; a version/format parameter acquiring unit configured for acquiring a version/format parameter; a correction characteristic acquiring unit configured for searching for a characteristic position in the barcode image and acquiring a correction characteristic according to the characteristic position; a module information processing unit configured for calculating a grayscale value corresponding to a module according to the version/format parameter, the barcode parameter and the correction characteristic; a binarizing unit configured for binarizing the module; a codeword extracting unit configured for extracting a codeword according to the binarized module; and an error correction and decoding unit configured for decoding the codeword.

20 Claims, 6 Drawing Sheets

QR BARCODE DECODING CHIP AND DECODING METHOD THEREOF

CROSS-REFERENCE TO RELATED PATENT APPLICATIONS

This application claims the benefit, pursuant to 35 U.S.C. §119(a), of P.R. China Patent Application No. 201010189802.3, filed on Jun. 1, 2010, entitled "QR Barcode Decoding Chip and Decoding Method Thereof" by Dong Guo, Rongsheng Liu, Xianfu Wang and Fusheng Lan, the disclosure for which is hereby incorporated herein in its entirety by reference.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference.

FIELD OF THE INVENTION

The present disclosure generally relates to the technical field of barcode identification, and more particularly, to a QR barcode decoding chip and a decoding method thereof.

BACKGROUND OF THE INVENTION

Conventionally, in a process of decoding a matrix-type two-dimensional barcode, a photographic device is used to take a picture of the barcode so as to get a barcode image, and then processes such as denoising, grayscale extraction, adaptive brightness equalization, binarization, codeword extraction and decoding are carried out on the barcode image. However, in the prior 2D barcode identifying method described above, the adaptive brightness equalization and the binarization of the barcode image are carried out on each of the pixels respectively. Therefore, the grayscale of each of the pixels must be adjusted and then compared with a grayscale threshold. This represents a great computational burden and lowers the speed of the system.

In view of the shortcomings of the prior art, what are needed, therefore, are a matrix-type two-dimensional barcode decoding chip and a decoding method thereof which can ensure quick and successful execution of a decoding process.

BRIEF DESCRIPTION OF THE DRAWINGS

The components in the drawings are not necessarily drawn to scale, the emphasis instead being placed upon clearly illustrating the principles of at least one embodiment of the present disclosure. In the drawings, like reference numerals designate corresponding parts throughout various views, and all the views are schematic.

DETAILED DESCRIPTION OF THE INVENTION

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

To facilitate better understanding of the present disclosure by those skilled in the art, the following terms related to barcodes are provided for reference. Some of the barcode terms are from the National Standard GB/T 12905-2000 of the People's Republic of China, and are not intended to limit the present disclosure.

Barcode symbol: a combination of bars or blanks or a combination of modules representing information defined by a certain kind of barcode.

Codeword: a codeword represents an intermediate value occurring when a source data is transformed into a barcode symbol. The number of codewords in a symbol determines the number of all symbols in the barcode symbol.

Data codeword: a data codeword represents a value of a data symbol.

Error correction codeword: an error correction codeword represents a value of an error correction symbol.

Module: as the smallest independent unit in a matrix-type 2D barcode, a module represents a bit of binary data.

Functional pattern: a kind of specific pattern in a matrix-type 2D barcode symbol for symbol positioning and characteristic identification, including detection patterns, positioning patterns, correction patterns and the like.

Detection pattern: a kind of special pattern in a matrix-type 2D barcode symbol pattern for symbol positioning in a barcode image; also termed as a position detection pattern.

Positioning pattern: a kind of pattern in a matrix-type 2D barcode symbol pattern for determining pixel coordinates of a module in the symbol.

Correction pattern: a kind of fixed reference pattern in a matrix-type 2D barcode symbol pattern for determining a position of a symbol. In case a certain extent of distortion or stain exists in a barcode image, the correction pattern can be used to correct pixel coordinates of a module in the barcode image.

Coding region: a region in the matrix-type 2D barcode symbol pattern that is unoccupied by any functional pattern. The coding region is used to encode data and error correction codewords and represent data symbols and error correction symbols.

Version: a sequence representing specifications of a matrix-type 2D barcode symbol, which reflects a symbol size, the number of modules in the symbol and arrangement of modules in the symbol.

Version information: a kind of functional pattern in a matrix-type 2D barcode symbol pattern for determining a version No. of a matrix-type 3D barcode symbol.

Format: representing an error correction level and a mask pattern used by a matrix-type 2D barcode symbol.

Format information: a kind of functional pattern in a matrix-type 2D barcode symbol pattern for determining an error correction level and a mask pattern used by a matrix-type 2D barcode symbol.

Mask pattern: a mask pattern is used for an XOR operation on a bit map in the coding region for purpose to equalize the ratio of dark-colored modules and light-colored modules in the symbol and reduce occurrence of patterns that might influence the processing of the barcode image.

Binarized barcode image: a grayscale barcode image is processed by using a global threshold or a local threshold to obtain a binarized barcode image with only a dark color and a light color.

Threshold: a threshold is a boundary value that separates two inspection levels from each other, and a value of the threshold per se is a lower limit of the upper level.

Module error: a module error means that, in a binarized barcode image, dark and light color statuses of a module are inverse to the design.

Pixel: a unit in a barcode image that corresponds to a single photosensitive unit in a photosensitive array (e.g., a CCD or CMOS device). A pixel is generally considered as the minimum integral unit of the barcode image. A digital barcode image is generally stored in the unit of pixels, and a pixel is a unit having the minimum area in the digital barcode image.

Figure 1:
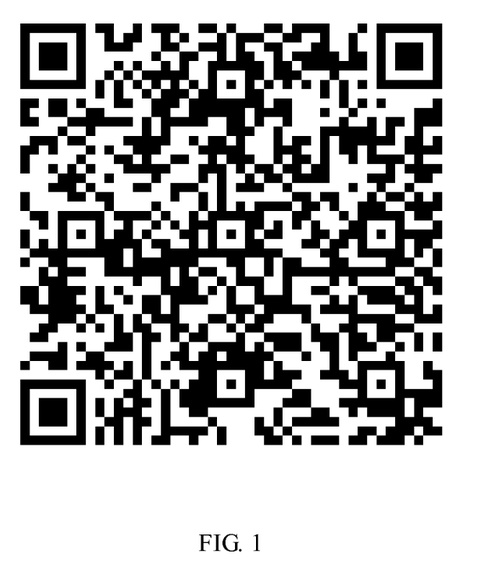
FIG. 1 is a schematic view of barcode symbol patterns of QR barcode according to the present disclosure.
Figure 2:
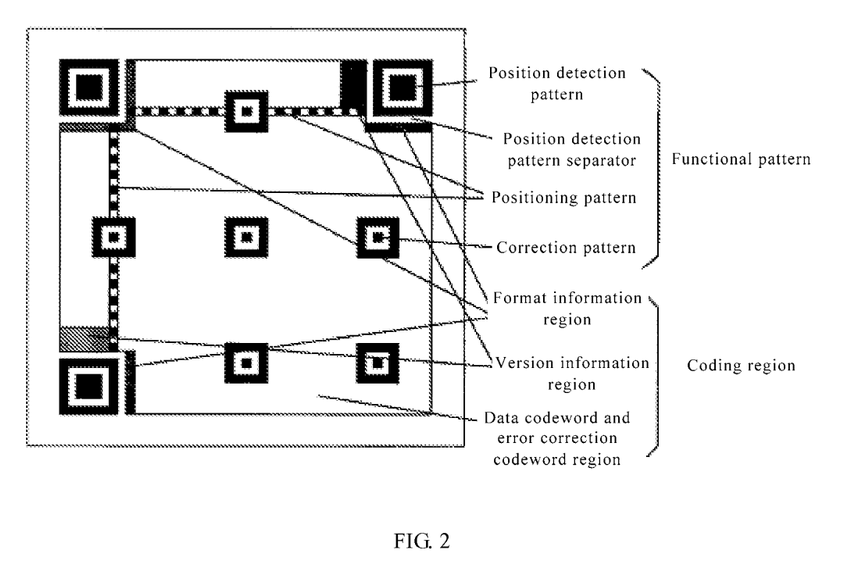
FIG. 2 is schematic view illustrating functions of the barcode symbol patterns of the QR barcode according to the present disclosure.

FIG. 1 is a schematic view of barcode symbol patterns of QR barcode according to the present disclosure. FIG. 2 is a schematic view illustrating functions of the barcode symbol patterns of the QR barcode according to the present disclosure. To make it easier for those skilled in the art to understand the present disclosure, a brief description will be made on QR barcode with reference to FIG. 1 to 2 hereinafter.

As shown in FIG. 1, the QR barcode have characteristics similar to an arithmetic matrix in terms of the structural form and element arrangement thereof. The QR barcode symbols have a common characteristic that they are all composed of specific symbol functional patterns and pattern modules that are distributed at elemental positions of the matrix to represent data information (e.g., square pattern modules, circular pattern modules, equilateral polygonal pattern modules and etc). Each dark-colored module unit represents a binary bit of "1", and each light-colored module unit represents a binary bit of "0" (of course, alternatively, it may also be that each dark-colored module unit represents a binary bit of "0", and each light-colored module unit represents a binary bit of "1"). A data codeword flow is represented by different combinations of unit modules distributed at matrix elemental positions. Symbols of QR barcode are comprised of eight modules arranged in a particular rule. Each kind of QR barcode has a unique functional pattern which is used for symbol identification, determination of symbol positions and module parameters, correction of a symbol module, and the like.

As shown in FIG. 2, at the periphery of the QR barcode symbol patterns is a blank region, which is a region surrounding the symbol patterns. The blank region has a reflectivity identical to that of the light-colored modules, which facilitates the searching for characteristics in the barcode symbol patterns. The QR barcode symbol patterns have a common characteristic that they all include two major sections, namely, functional patterns and a coding region. The functional patterns include position detection patterns for detecting a barcode position and identifying a barcode type, and correction patterns, positioning patterns or directing patterns for correcting or positioning a position of a symbol module. The coding region includes symbol information (the barcode symbol information includes version information representing the way in which the modules are arranged and the number of modules, and format information representing an error correction level, an error correction bit, a mask pattern and the like), a data codeword and error correction codeword region.

FIG. 2 is a schematic view illustrating functions of symbol patterns of a QR code. The functional patterns of the QR code include position detection patterns, position detection pattern separators, correction patterns, and positioning patterns. The coding region comprises a version information region and a format information region that represents symbol information, and a data codeword and error correction codeword region. The QR code symbol pattern includes three identical position detection patterns located at an upper left corner, an upper right corner and a lower left corner of the symbol pattern respectively, as shown in FIG. 2. Each of the position detection patterns may be viewed to consist of three overlapped concentric squares, which are 7×7 dark-colored modules, 5×5 light-colored modules and 3×3 dark-colored modules respectively. The position detection patterns have a module width ratio of 1:1:3:1:1. The possibility of finding similar patterns in other regions of the QR code symbol pattern is very low. Therefore, a QR code symbol pattern that possibly exists may be identified in the barcode image according to the position detection patterns. By identifying the three position detection patterns, a range and a direction in which the QR code symbol pattern is located in the barcode image can be clearly determined. Furthermore, according to dimensions of the position detection patterns, the dimensional parameters of a single module can be roughly determined.

In the QR code symbol pattern, position detection pattern separators are located between each of the position detection patterns and the coding region, and each of the position detection pattern separators consists of a light-colored module having a width of one module.

The number of correction patterns in the QR code symbol pattern depends on the version No., and all symbols of Version 2 and above (including Version 2) have a correction pattern(s). Similar to the positioning detection patterns, each correction pattern may be viewed to consist of three overlapped concentric squares, which are 5×5 dark-colored modules, 3×3 light-colored modules, and one dark-colored module located at the center, respectively. The correction patterns have a module width ratio of 1:1:1:1:1.

The positioning patterns in the QR code symbol pattern include a horizontal positioning pattern and a vertical positioning pattern, which consist of a row of dark-colored modules and light-colored modules alternately arranged and a column of dark-colored modules and light-colored modules alternately arranged respectively and both of which have a width of one module. This kind of positioning patterns is also termed as a track line or track code. A positioning pattern ends with dark-colored modules at both ends. The horizontal positioning pattern lies between two position detection patterns at the top and at the sixth column of the symbol pattern. The vertical positioning pattern lies between two positioning patterns at the left and at the sixth column of the symbol pattern.

The coding region comprises the version information, the format information as well as the data codeword and the error correction codeword. The version information represents the number of modules and the way in which the modules are arranged in the QR code symbol, and the format information represents an error correction level and mask pattern information of the QR code. The version information is of 18 bits, of which 6 are data bits and 12 are error correction bits obtained through BCH code calculation. The format information is of 15 bits, of which 5 are data bits and 10 are error correction bits obtained through BCH code calculation. The first and the second data bits represent an error correction level of the symbol, and the third to the fifth data bits represent mask pattern information of the symbol. For QR code symbols of all versions, the positions of the version information and the format information in the symbols are all the same; specifically, the version information lies at a position to the left of the upper right position detection pattern separator and a position at the top side of the lower left position detection pattern separator in the coding region. The format information lies at a position at the bottom side of the upper right position detection pattern separator, a position to the right of the lower left position detection pattern separator and positions at two sides of the upper left position detection pattern separator. The data codeword represents data information recorded in the QR code symbol. The error correction codeword is formed by performing error correction encoding on the data codeword and is used for error correction of the data codeword.

Figure 3:
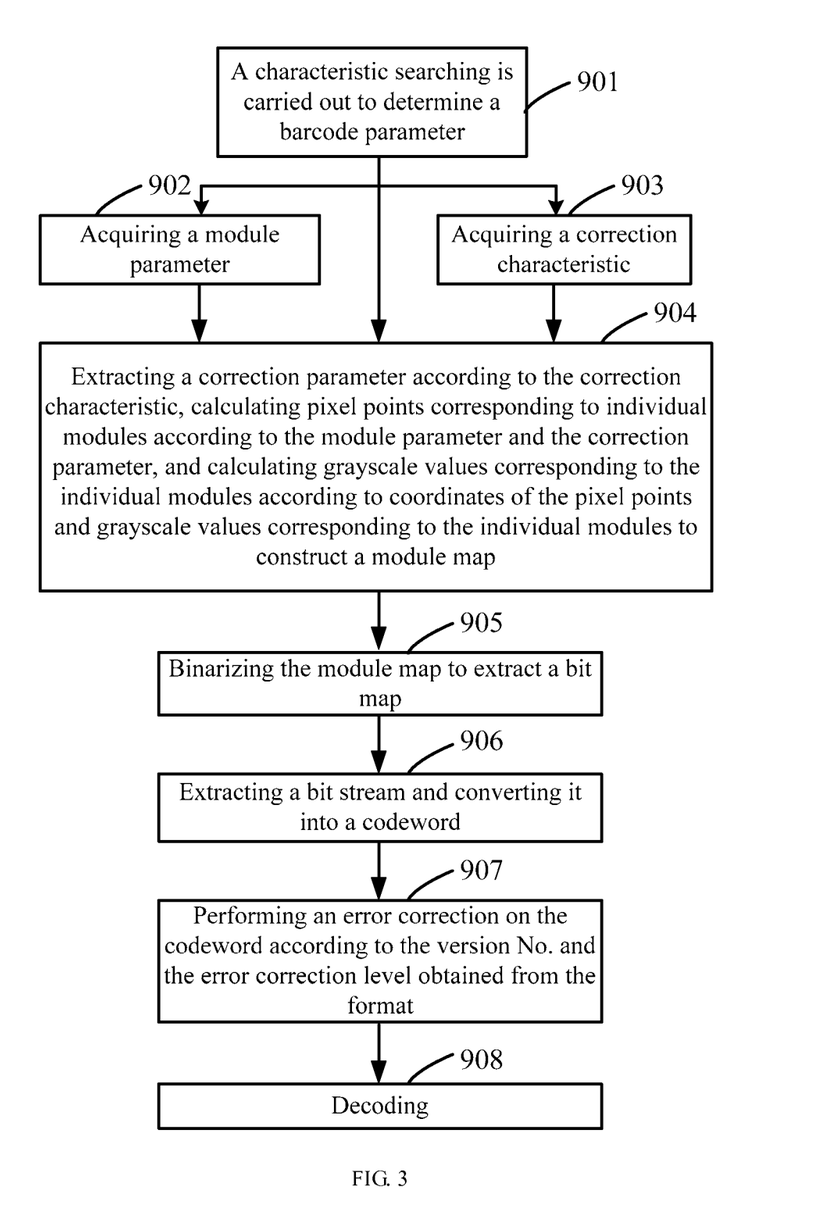
FIG. 3 is a flowchart of a decoding method for a QR barcode decoding chip according to an embodiment of the present disclosure.

As shown in FIG. 3, in a step 901, a characteristic searching is carried out in the barcode image to determine pixel coordinates of functional patterns, and barcode parameters are calculated according to the pixel coordinates of the functional patterns and a module dimension ratio. The barcode parameters include a barcode region, a barcode direction or barcode module dimensions, module coordinates and etc. In an implementation of the present disclosure, this step may be accomplished by detecting functional patterns, particularly position detection patterns or correction patterns, through template matching. In another implementation of the present disclosure, this step may also be accomplished through scale detection, which includes: detecting boundary points between dark-colored and light-colored modules in the barcode image through scanning; comparing a spacing relationship of the boundary points between the dark-colored and light-colored modules with a module dimension scale of the position detecting patterns or correction patterns; and determining pixel coordinates of the characteristic pattern in the barcode image according to the comparison result.

Furthermore, the present disclosure also provides a method of identifying a QR barcode through row and column line detection, which method includes the following steps of: extracting a plurality of black-white boundary line segments of a predetermined length within a predetermined region of the barcode image; forming a plurality of straight lines from the plurality of black-white boundary line segments; grouping the plurality of straight lines into a row parallel line group and a column parallel line group according to characteristics of parallel lines; identifying a type of the QR barcode by making a determination on a grid formed by the row parallel line group and the column parallel line group according to characteristics of the QR barcode; acquiring the pixel coordinates of the characteristic pattern of the grid formed by the row parallel line group and the column parallel line group, and acquiring a barcode parameter according to pixel coordinates of the characteristic pattern.

In a step 902, according to the pixel coordinates of the functional patterns and barcode parameters, version information and format information are extracted from the barcode image and decoded to acquire the version and format parameters including, for example, the version No., the error correction level or the mask pattern. In some cases, when the version information and format information region in the barcode image are stained to cause failure to read the data, the format and the version of the barcode can be estimated according to the type of the barcode. The format includes a mask pattern or an error correction level. For example, the version and the format can be estimated by permuting and combining possible versions, mask patterns or error correction levels. As an example, the version and the format are estimated by permuting and combining the 1~40 versions of the QR code, the four error correction levels L, M, Q and H, and the mask pattern, and then subsequent processings are carried out on the barcode image according to the estimated format and version.

Alternatively, a correction pattern is searched in the barcode image according to the pixel coordinates of the position detection patterns and the barcode parameters detected. For example, the correction pattern is a track line (as termed as a railway line). Then, pixel coordinates of a central point and/or marginal points of the correction pattern (i.e., pixel coordinates of the track line) are obtained in order to obtain a correction characteristic.

In a step 903, a characteristic pattern, e.g., a corner point of the barcode image, a position detection pattern, a correction pattern, a positioning pattern, a dynamic characteristic template, a scribing characteristic template or the like, is searched in the barcode image. Then, correction characteristics including, for example, pixel coordinates and a grayscale value of the correction point, are obtained according to the characteristic pattern.

In a step 904, a module parameter is determined according to the version parameter, module coordinates corresponding to the correction characteristic are calculated according to the correction characteristic, the module parameter and the barcode parameter, and a correction parameter is calculated according to the pixel coordinates and the module coordinates of the correction characteristic. The correction parameter reflects the mapping relationship between the pixel points of the barcode image and the barcode modules. Then, pixel points corresponding to individual modules are calculated according to the module parameter and the correction parameter, and grayscale values corresponding to the individual modules are calculated according to the coordinates and grayscale values of the pixel points corresponding to the individual modules to construct a module map.

In a step 905, the module map is binarized to extract a bit map.

In a step 906, according to the mask pattern obtained in the step 902, a de-masking operation (e.g., an XOR operation) is carried out on the bit map to remove the mask and restore a bit stream representing a data codeword and an error correction codeword. If no mask pattern is used when the barcode symbol is encoded, then this step can be omitted.

In a step 907, according to the arrangement rules of QR barcode, the bit stream is extracted and converted into the data codeword and the error correction codeword.

In a step 908, according to the version No. and the error correction level obtained in the step 902, the data codeword and the error correction codeword are re-arranged in terms of blocks, and error detection and error correction operations are performed thereon to correct deletion errors and unknown errors until the maximum error correction capacity defined by the version No. and the error correction level is reached. Then, a data block sequence is re-assembled to restore a data bit stream representing the QR barcode information.

In a step 909, the restored data bit stream is decoded to obtain the QR barcode information.

Figure 4:
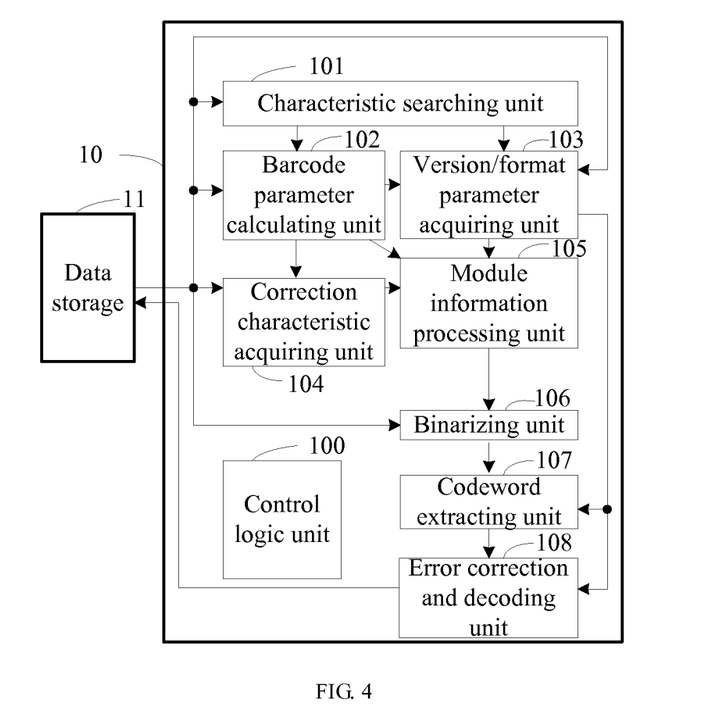
FIG. 4 is a schematic structural view of a QR barcode decoding chip according to an embodiment of the present disclosure.

Hereinafter, the QR barcode decoding chip according to the present disclosure will be detailed. FIG. 4 is a schematic structural view of a matrix-type 2D barcode identifying module according to an embodiment of the present disclosure.

As shown in FIG. 4, the data storage 11 stores a barcode image, and the matrix-type 2D barcode identifying module 10 identifies and decodes the barcode image stored in the data storage 11. The matrix-type 2D barcode identifying module 10 includes a control logic unit 100, a characteristic searching unit 101, a barcode parameter acquiring unit 102, a version and format parameter acquiring unit 103, a correction characteristic acquiring unit 104, a module information processing unit 105, a binarizing unit 106, a codeword extracting unit 107 and an error correction and decoding unit 108.

The control logic unit 100 is configured to control the operation statuses and processing flows of the characteristic searching unit 101, the barcode parameter acquiring unit 102, the version and format parameter acquiring unit 103, the correction characteristic acquiring unit 104, the module information processing unit 105, the binarizing unit 106, the codeword extracting unit 107 and the error correction and decoding unit 108. The control logic unit 100 performs the controlling operations in the form of a finite state machine. A finite state machine is also termed as a finite state automatic machine or just briefly termed as a state machine, and is a state logic representing a finite number of states as well as transitions and actions between these states. The control logic unit 100 may be implemented by programmable logic devices, programmable logic controllers, logic gates and triggers. In a preferred embodiment, the control logic unit 100 includes a register, a combined logic for determining state transitions and a combined logic for determining an output of a state control module. The register is configured for storing state variables.

The characteristic searching unit 101 determines pixel coordinates of characteristic patterns in the barcode image by searching for the characteristic pattern in the barcode image. The characteristic patterns include but are not limited to functional patterns of the barcode, such as position detection patterns, correction patterns, positioning patterns and the like. In a preferred embodiment, the characteristic searching unit 101 searches for position detection patterns through template matching; specifically, a position detection pattern detecting template is generated according to a module width ratio of 1:1:3:1:1 of the position detection patterns. Then, the position detection pattern detecting template is translated relative to the barcode image and a grayscale matching operation is performed thereon to determine an optimal matching position between the position detection pattern detecting template and the barcode image, and pixel coordinates of central points or marginal points of the position detection patterns in the barcode image are determined according to the optimal matching position. In another embodiment of the present disclosure, the characteristic searching unit 101 may also determine pixel coordinates of the characteristic patterns in the barcode image through scale detection, which includes: detecting boundary points between dark-colored and light-colored modules in the barcode image through scanning; comparing a spacing relationship of the boundary points between the dark-colored and light-colored modules with a module dimension scale of the position detecting patterns or correction patterns; and determining pixel coordinates of the characteristic pattern in the barcode image according to the comparison result. Furthermore, the present disclosure also provides an embodiment of identifying a QR barcode through row and column line detection, which includes the following steps executed by the characteristic searching unit 101: extracting a plurality of black-white boundary line segments of a predetermined length within a predetermined region of the barcode image; forming a plurality of straight lines from the plurality of black-white boundary line segments; grouping the plurality of straight lines into a row parallel line group and a column parallel line group according to characteristics of parallel lines; identifying a type of the QR barcode by making a determination on a grid formed by the row parallel line group and the column parallel line group according to characteristics of the QR barcode; and acquiring the pixel coordinates of the characteristic pattern of the grid formed by the row parallel line group and the column parallel line group.

The barcode parameter acquiring unit 102 calculates a barcode parameter (e.g., a barcode direction, a barcode region, and etc.) according to pixel coordinates of the functional pattern detected by the characteristic searching unit 101. Further, according to the pixel coordinates and the module dimension ratio of the functional patterns and the module dimension ratio of the barcode parameter acquiring unit 102, the barcode parameter acquiring unit 102 may further calculate a range of the barcode region and roughly calculate a barcode module size (i.e., a ratio of the barcode module size to the pixel width), and further estimate the module coordinates according to the range of the barcode region and the barcode module size.

The version and format parameter acquiring unit 103 extracts version information and format information from the barcode image according to the pixel coordinates of the functional patterns and the barcode parameters detected by the characteristic searching unit 101, and decodes the version information and the format information to obtain the version and format parameters. The version information and the format information of the coding region are disposed adjacent to the position detection patterns, so the version and format parameter acquiring unit 103 can search version information and format information regions according to the pixel coordinates of the position detection patterns, the barcode direction and the barcode module size, and then obtain the version and format parameters (e.g., the version No., the error correction level, the mask pattern, and etc.) through binarizing and error correction and decoding operations.

In some cases, the version information and format information regions in the barcode image may be stained to cause failure to read the data. In such cases, the version and format parameter acquiring unit 103 can estimate the format and the version of the barcode according to the type of the barcode. The format includes a mask pattern and an error correction level. For example, the version and the format can be estimated by permuting and combining possible versions, mask patterns or error correction levels. As an example, the version and the format are estimated by permuting and combining the 1~40 versions of the QR code, the four error correction levels L, M, Q and H, and the mask patterns, and then subsequent processings are carried out on the barcode image according to the estimated format and version.

By searching for characteristic positions in the barcode image, e.g., corner points of the barcode image, position detection patterns, correction patterns, positioning patterns, dynamic templates or the like, the correction characteristic acquiring unit 104 acquires the correction characteristics according to the characteristic positions. The correction characteristics include, for example, pixel coordinates or module coordinates as well as a grayscale value of the correction point. The correction characteristic acquiring unit 104 may be implemented in various ways, but is not merely limited to acquiring the correction characteristics according to the correction patterns.

Figure 5:
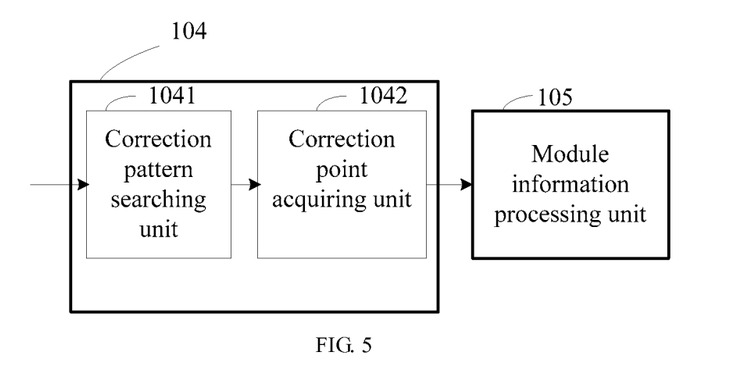
FIG. 5 is a schematic view of a first kind of correction point acquisition structure of a correction characteristic acquiring unit in a QR barcode decoding chip according to an embodiment of the present disclosure.

FIG. 5 is a schematic view of a first kind of correction point acquisition structure of a correction characteristic acquiring unit in a matrix-type 2D barcode identifying module according to an embodiment of the present disclosure. As shown in FIG. 5, the correction characteristic acquiring unit 104 includes a correction pattern searching unit 1041 and a correction point acquiring unit 1042. Similar to the characteristic searching unit 101, by referring to the module dimension ratio of the correction pattern and the barcode parameter, the correction pattern searching unit 1041 generates a correction pattern detecting template according to the module dimension ratio of the correction pattern; for example, the correction pattern detecting template is generated according to a module width ratio of 1:1:1:1:1. Then, the correction pattern detecting template is translated relative to the barcode image and a grayscale matching operation is performed thereon. The correction point acquiring unit 1042 calculates similarities of the matching results to determine an optimal matching position between the correction pattern detecting template and the barcode image, and determines the pixel coordinates and grayscale values of a central point or marginal points of the correction pattern in the barcode image according to the optimal matching position.

The module information processing unit 105 determines the module parameter according to the version parameter, calculates module coordinates corresponding to the correction characteristics according to the correction characteristics, the module parameter and the barcode parameter, and calculates a correction parameter according to the pixel coordinates and the module coordinates of the correction characteristics. The correction parameter reflects a mapping relationship between pixel points of the barcode image and the barcode modules. Then, the module information processing unit 105 calculates pixel points corresponding to individual modules according to the module parameter and the correction parameter, and calculates grayscale values corresponding to the individual modules according to the coordinates and grayscale values of the pixel points corresponding to the individual modules so as to construct a module map.

Figure 6:
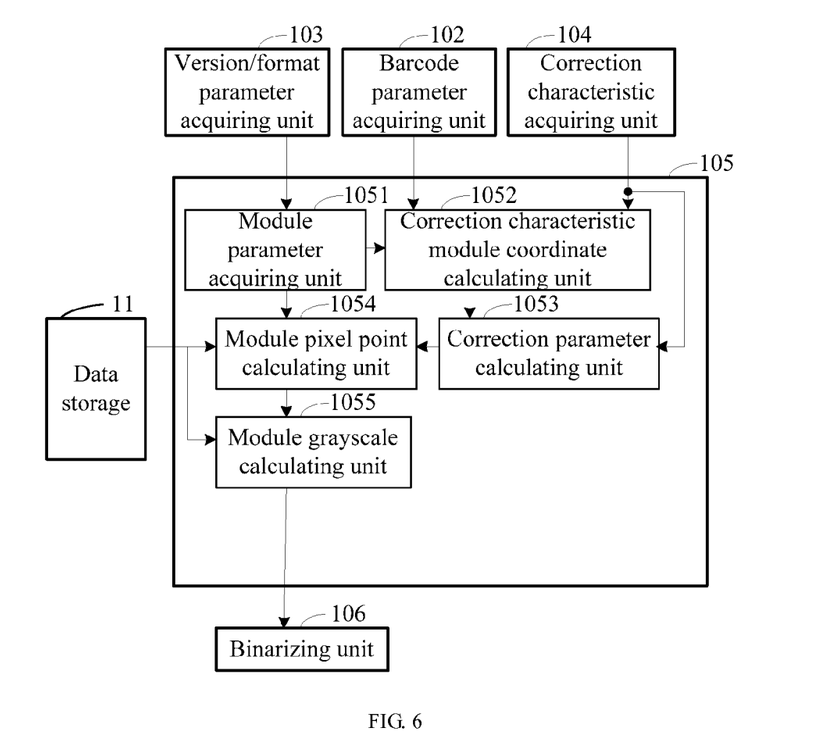
FIG. 6 is a schematic structural view of a module information processing unit in a QR barcode decoding chip according to an embodiment of the present disclosure.

FIG. 6 is a schematic structural view of a module information processing unit in a QR barcode identifying module according to an embodiment of the present disclosure. The module information processing unit 105 includes a module parameter calculating unit 1051, a correction characteristic module coordinate calculating unit 1052, a correction parameter calculating unit 1053, a module pixel point calculating unit 1054 and a module grayscale calculating unit 1055. According to the version parameter (e.g., the version No.), the module parameter calculating unit 1051 acquires the number of rows of modules, the number of columns of modules and the number of modules corresponding to the version parameter by looking up a table or through functional calculation according to the version parameter (e.g., the version No.). The correction characteristic module coordinate calculating unit 1052 calculates relative positions of the pixel coordinates in the barcode region according to the pixel coordinates of the correction characteristics provided by the correction characteristic acquiring unit 104 and the barcode parameter, and calculates module coordinates of the correction characteristics according to the relative positions and the module parameter. The correction parameter calculating unit 1053 calculates the correction parameter according to the pixel coordinates and the module coordinates of the correction characteristic. The correction parameter reflects a mapping relationship between pixel points of the barcode image and the barcode modules. The module pixel point calculating unit 1054 calculates pixel points corresponding to individual modules according to the module parameter and the correction parameter.

The mapping between the modules and the pixel points may be implemented in various ways, including perspective transformation, quadratic polynomial, cubic polynomial, triangular grid, wavelet transformation, or a combination thereof. The modular pixel point calculating unit 1054 can calculate coordinates of corresponding pixel points according to the module coordinates, or calculate the corresponding module coordinates according to the pixel coordinates. The present disclosure has no limitation on the calculation process described above and the way in which it is accomplished. The module grayscale calculating unit 1055 calculates grayscale values corresponding to individual modules according to coordinates and grayscale values of pixel points corresponding to the individual modules to construct the module map. The grayscale values of the modules can be calculated in various ways, including statistical calculation, interpolation, averaging calculation, weighting calculation, or a combination thereof. The present disclosure has no limitation on the calculation process described above and the way in which it is accomplished.

To make it easier for those skilled in the art to understand the process made by the module information processing unit of the present disclosure, a calculation method will now be described as an example to illustrate the transformation principle of the module information processing unit of the present disclosure. However, this calculation method shall not be construed as a limitation on the module information processing unit of the present disclosure.

Figure 7:
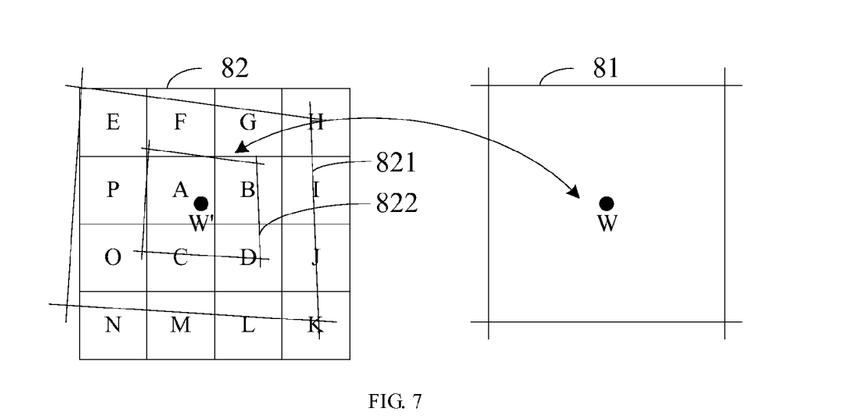
FIG. 7 is a schematic view illustrating transformation principles of a module information processing unit in a QR barcode decoding chip according to an embodiment of the present disclosure.

FIG. 7 is a schematic view illustrating transformation principles of a module information processing unit in a QR barcode identifying module according to an embodiment of the present disclosure. There is a mapping relationship between the module 81 and the pixel region 82, and a deformation region 821 corresponds to the mapping range of the module 81 in the pixel region 82. A central point W of the module 81 is mapped to a mapping point W' in the pixel region 82. As is shown in FIG. 7, the module 81 corresponds to sixteen pixel points, i.e., the pixel points A-P, among which the pixel points A, B, C, D surround the mapping point W'. A central deformation region 822 corresponds to a mapping range of the central region of the module 81 in the pixel region 82. For the matrix-type barcode, the central region of the module reflects the value of the module most accurately. In a preferred embodiment, a grayscale value of the central point W corresponding to the mapping point W' can be calculated according to grayscale values of the four pixel points A, B, C, D. Of course, the grayscale value of the module 81 may also be calculated according to all pixel points corresponding to the pixel region 82. That is, the grayscale value of the module 81 can be calculated according to grayscale values of a number of pixel points corresponding to the module 81.

The binarizing unit 106 receives the module grayscale values calculated by the module information processing unit 105, and binarizes the module map according to a threshold to extract a bit map. The threshold may be preset, obtained through global threshold acquisition or local threshold acquisition, or obtained in other ways.

According to the mask pattern obtained by the version and format parameter acquiring unit 103, the codeword extracting unit 107 performs a de-masking operation (e.g., an XOR operation) on the bit map to remove the mask and restore a bit stream representing a data codeword and an error correction codeword, extracts the bit stream according to the arrangement rules of QR barcode, and transforms the bit stream into a codeword. In some cases, the barcode was not processed by using a mask pattern when it is generated, so the codeword extracting unit 107 can extract a bit stream representing a data codeword and an error correction codeword directly from the bit map and transform the bit stream into a data codeword and an error correction codeword.

The error correction and decoding unit 108 re-arranges the data codeword and the error correction codeword in terms of blocks according to the version No. and the error correction level obtained by the version and format parameter acquiring unit 103, and performs error detection and error correction operations thereon to correct deletion errors and unknown errors until the maximum error correction capacity defined by the version No. and the error correction level is reached. Then, the error correction and decoding unit 108 re-assembles a data block sequence to restore a data bit stream representing the QR barcode information, and decodes the restored data bit stream to obtain QR barcode barcode information.

Figure 8:
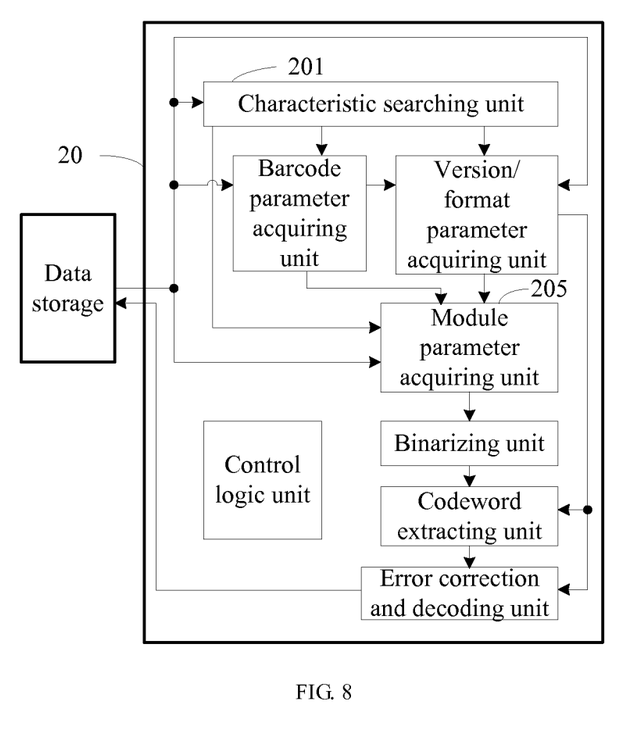
FIG. 8 is a schematic structural view of a QR barcode decoding chip according to another embodiment of the present disclosure.

FIG. 8 is a schematic structural view of a QR barcode identifying module according to another embodiment of the present disclosure. Different from the QR barcode identifying module of the previous embodiment, the QR barcode identifying module 20 of this embodiment has the following improvements: searching of the functional patterns or correction characteristics is accomplished by the characteristic searching unit 201 and the correction characteristic acquiring unit is cancelled.

Similar to the previous embodiment, the characteristic searching unit 201 determines pixel coordinates of the characteristic pattern in the barcode image by searching for the characteristic pattern in the barcode image. The characteristic pattern is, for example, a position detection pattern. By adjusting the module dimension ratio of the template matching or the module coordinates, the characteristic searching unit 201 can also search for other characteristic patterns, for example, correction patterns. The characteristic searching unit 201 generates a correction pattern detecting template according to the module dimension ratio of the correction pattern; for example, the correction pattern detecting template is generated according to a module width ratio of 1:1:1:1:1. Then, the correction pattern detecting template is translated relative to the barcode image and a grayscale matching operation is performed thereon. The correction point acquiring unit 1042 calculates similarities of the matching results to determine an optimal matching position between the correction pattern detecting template and the barcode image, and determines the pixel coordinates and grayscale values of a central point or marginal points of the correction pattern in the barcode image according to the optimal matching position.

The characteristic patterns include but are not limited to functional patterns of the barcode such as position detection patterns, correction patterns, positioning patterns and the like. For ease of understanding by those skilled in the art, other forms of the characteristic patterns than the functional patterns will be illustrated hereinafter. The QR barcode is a kind of 2D barcodes, and the barcode symbol pattern thereof has characteristics of an arithmetic matrix. The barcode symbols may be considered to include a plurality of dark-colored and light-colored rectangular modules. By choosing a set of rectangular module patterns that are easy to be distinguished from adjacent ones in the barcode image region, a dynamic characteristic template can be formed. Additionally, by searching for two modules of the same color (i.e., dark-colored modules or light-colored modules) spaced apart in a same row or column of the barcode image, a scribing characteristic template can be formed.

The characteristic searching unit 201 generates a detection template for the dynamic characteristic template or the scribing characteristic template according to a module dimension ratio corresponding to module coordinates of the dynamic characteristic template or the scribing characteristic template, translates the detection template for the dynamic characteristic template or the scribing characteristic template relative to the barcode image and performs a grayscale matching operation thereon. Similarities of the matching results are calculated to determine an optimal matching position between the detection template for the dynamic characteristic template or the scribing characteristic template and the barcode image, and the pixel coordinates and grayscale values of central points or marginal points of the dynamic characteristic template or the scribing characteristic template in the barcode image are determined according to the optimal matching position.

The module information processing unit 205 directly receives the pixel coordinates of the characteristic patterns, which are provided by the characteristic searching unit 201, as the correction characteristic for processing. The correction characteristics are, for example, pixel coordinates of central points and marginal points of position detection patterns in the barcode image, pixel coordinates of central points and marginal points of the correction patterns, pixel coordinates of the positioning patterns, or pixel coordinates of central points of the dynamic characteristic pattern or the scribing characteristic template.

Figure 9:
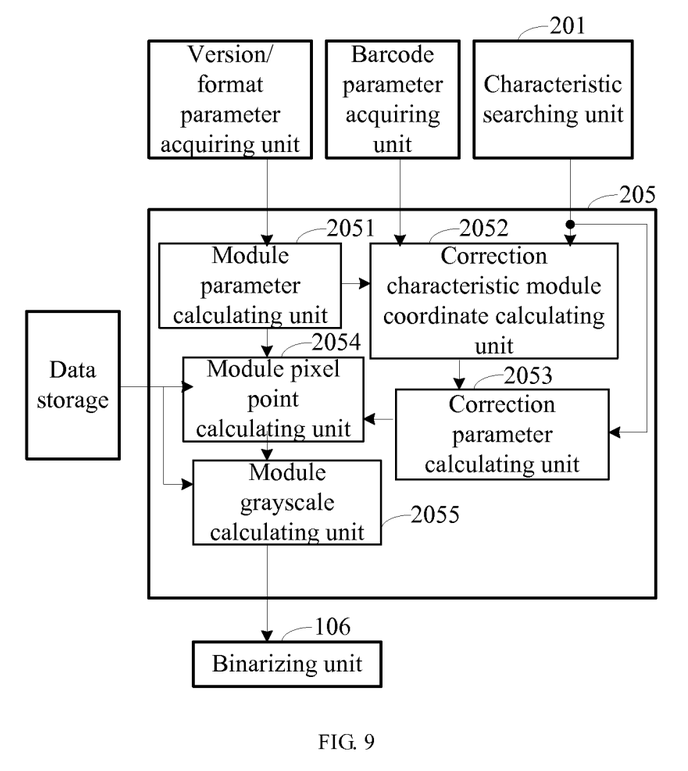
FIG. 9 is a schematic view of a second kind of correction point acquisition structure of a correction characteristic acquiring unit in a QR barcode decoding chip according to another embodiment of the present disclosure.

FIG. 9 is a schematic view of a module information processing unit in a QR barcode identifying module according to another embodiment of the present disclosure. Different from the previous embodiment, the correction characteristic module coordinate calculating unit 2052 is connected to the characteristic searching unit 201 and calculates the module coordinates of the characteristic patterns according to the module parameter provided by the module parameter calculating unit 2051 and the barcode parameter. The correction parameter calculating unit 2053 calculates the correction parameter according to the pixel coordinates and the module coordinates of the characteristic patterns. The correction parameter reflects a mapping relationship between the pixel points of the barcode image and the barcode modules. The module pixel point calculating unit 2054 calculates pixel points corresponding to individual modules according to the module parameter and the correction parameter. Calculation of the mapping between the modules and the pixel points may be accomplished in various ways, including perspective transformation, quadratic polynomial, cubic polynomial, triangular grid, wavelet transformation, or a combination thereof. The module grayscale calculating unit 2055 calculates grayscales corresponding to individual modules according to the coordinates and grayscale values of the pixel points corresponding to the individual modules to construct a module map.

According to the QR barcode decoding method of the present disclosure, by searching for correction characteristics, pixel coordinates and module coordinates of the correction characteristics are acquired, a mapping relationship between the pixel coordinates and the module coordinates of the barcode image is calculated, module grayscale values are calculated according to the mapping relationship, and then the module grayscale values are binarized to restore the barcode symbol patterns corresponding to the QR barcode. As compared to the prior art, the QR barcode decoding method performs the binarizing process after the barcode characteristic information has been known and the barcode image has been corrected according to the barcode characteristic information. As a result, influence of such factors as noises and distortions on the binarizing process is decreased and occurrence of module errors is reduced, which remarkably increases the capability of identifying the barcode and improves the possibility of successfully decoding the barcode.

The QR barcode decoding chip of the present disclosure is of a pipeline hardware structure, and identification and decoding of the barcode image are accomplished by hardware logics. Because the pipeline hardware structure is adapted to carry out pipeline operations and parallel processing on the barcode image, the processing speed is very high.

As compared to the typical decoding technologies for processors, the QR barcode decoding chip of the present disclosure is completely of a hardware structure without need of involvement of a processor in the decoding process. As compared to a processor, the chip structure has a more simple structure, a smaller area, lower power consumption and lower cost, and is easy to be integrated, so it is suitable for portable applications. Therefore, the present disclosure may be conveniently combined with the network of things, which provides a wider space for development of the barcode technology.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A QR (Quick Response) barcode decoding chip, comprising:
   (a) a characteristic searching unit configured for searching for a characteristic pattern in the barcode image to determine pixel coordinates of the characteristic pattern;
   (b) a barcode parameter acquiring unit configured for acquiring a barcode parameter according to the pixel coordinates of the characteristic pattern;
   (c) a version and format parameter acquiring unit configured for acquiring a version and format parameter;
   (d) a correction characteristic acquiring unit configured for searching for a characteristic position in the barcode image and acquiring a correction characteristic according to the characteristic position;
   (e) a module information processing unit configured for calculating a grayscale value corresponding to a module according to the version and format parameter, the barcode parameter and the correction characteristic;
   (f) a binarizing unit configured for binarizing the module grayscale value;
   (g) a codeword extracting unit configured for extracting a codeword according to the binarized module; and
   (h) an error correction and decoding unit configured for decoding the codeword.

2. The QR barcode decoding chip of claim 1, wherein the characteristic searching unit generates a characteristic pattern detection template according to a module dimension scale of the characteristic pattern, translates the characteristic pattern detection template relative to the barcode image, executes a grayscale matching process to determine an optimal matching position between the characteristic pattern detection template and the barcode image, and determines the pixel coordinates of the characteristic pattern in the barcode image according to the optimal matching position.

3. The QR barcode decoding chip of claim 1, wherein the characteristic searching unit detects boundary points between dark-colored modules and light-colored modules in the barcode image through scanning, compares a spacing relationship between the boundary points with a module dimension scale of the characteristic pattern, and determines the pixel coordinates of the characteristic pattern in the barcode image according to the comparison result.

4. The QR barcode decoding chip of claim 1, wherein the characteristic searching unit extracts from a predetermined region of the barcode image a plurality of black-white boundary line segments of a predetermined length, forms a plurality of straight lines from the plurality of black-white boundary line segments, groups the plurality of straight lines into a row parallel line group and a column parallel line group according to characteristics of parallel lines, and finally, identifies a type of the QR barcode by making a determination on a grid formed by the row parallel line group and the column parallel line group and according to characteristics of the QR barcode, and acquires the pixel coordinates of the characteristic pattern in the grid formed by the row parallel line group and the column parallel line group.

5. The QR barcode decoding chip of claim 1, wherein, according to the pixel coordinates of the characteristic pattern and the barcode parameter, the version and format parameter acquiring unit extracts version information and format information from the barcode image, and decodes the version information and the format information to acquire the version and format parameter.

6. The QR barcode decoding chip of claim 1, wherein the version and format parameter acquiring unit acquires the version and format parameter through estimation according to possible formats and possible versions of the QR barcode.

7. The QR barcode decoding chip of claim 1, wherein the module information processing unit comprises a module parameter calculating unit, a correction characteristic module coordinate calculating unit, a correction parameter calculating unit, a module pixel point calculating unit and a module grayscale value calculating unit, and wherein the module parameter calculating unit acquires a module parameter according to version and format parameter, the correction characteristic module coordinate calculating unit calculates module coordinates of the characteristic pattern according to the barcode parameter, the module parameter and the pixel coordinates of the characteristic pattern, the correction parameter calculating unit calculates a mapping relationship between the pixel coordinates and the module coordinates of the barcode image according to the pixel coordinates of the characteristic pattern and the module coordinates of the characteristic pattern, and the module pixel point calculating unit calculates pixel coordinates corresponding to individual modules according to the mapping relationship, and the module grayscale value calculating unit calculates the grayscale values of the individual modules according to the pixel coordinates corresponding to the individual modules.

8. A QR (Quick Response) barcode decoding chip, comprising:

(a) a characteristic searching unit configured for searching for a characteristic pattern in the barcode image to determine pixel coordinates of the characteristic pattern;

(b) a barcode parameter acquiring unit configured for acquiring a barcode parameter according to the pixel coordinates of the characteristic pattern;

(c) a version and format parameter acquiring unit configured for acquiring a version and format parameter;

(d) a module information processing unit configured for calculating a grayscale value corresponding to a module according to the version and format parameter, the barcode parameter, and the pixel coordinates of the characteristic pattern;

(e) a binarizing unit configured for binarizing the module grayscale value;

(f) a codeword extracting unit configured for extracting a codeword according to the binarized module; and (g) an error correction and decoding unit, being configured to decode the codeword.

9. The QR barcode decoding chip of claim 8, wherein the characteristic searching unit searches for a first characteristic pattern in the barcode image to determine pixel coordinates of the first characteristic pattern, and the barcode parameter acquiring unit acquires the barcode parameter according to the pixel coordinates of the first characteristic pattern.

10. The QR barcode decoding chip of claim 9, wherein the characteristic searching unit searches for a second characteristic pattern in the barcode image to determine pixel coordinates of the second characteristic pattern, and the module information processing unit calculates a grayscale value corresponding to the module according to the version and format parameter, the barcode parameter, and the pixel coordinates of the second characteristic pattern.

11. A method for decoding a QR (Quick Response) barcode in a decoding chip, comprising the following steps of:
   (a) acquiring an image of the barcode from a data storage, wherein the image in the data storage are obtained from a photosensitive array;
   (b) searching for a characteristic pattern of the image in a characteristic searching unit so as to obtain a barcode parameter in a barcode parameter acquiring unit;
   (c) acquiring a version parameter and using the version parameter to calculate a module parameter in a module information processing unit;
   (d) searching for a correction characteristic in a correction characteristic acquiring unit and acquiring pixel coordinates of the correction characteristic;
   (e) calculating module coordinates of the correction characteristic in the module information processing unit according to the barcode parameter, the module parameter, and the pixel coordinates of the correction characteristic;
   (f) calculating a mapping relationship between pixel coordinates and module coordinates of the image in the module information processing unit according to the pixel coordinates of the correction characteristic and the module pixels of the correction characteristic;
   (g) calculating a module grayscale value in the module information processing unit according to the mapping relationship;
   (h) binarizing the module grayscale value in a binarizing unit;
   (i) extracting a codeword in a codeword extracting unit according to a result of the binarizing step; and
   (j) decoding the codeword in an error correction and decoding unit.

12. A method for decoding a QR (Quick Response) barcode in a decoding chip, comprising the following steps of:
   (a) acquiring an image of the barcode from a data storage, wherein the image in the data storage are obtained from a photosensitive array;
   (b) searching for a characteristic pattern of the image in a characteristic searching unit so as to obtain a barcode parameter in a barcode parameter acquiring unit and pixel coordinates of the characteristic pattern in the characteristic searching unit;
   (c) acquiring a version parameter and using the version parameter to calculate a module parameter in a module information processing unit;
   (d) calculating module coordinates of the characteristic pattern in the module information processing unit according to the barcode parameter, the module parameter, and the pixel coordinates of the characteristic pattern;
   (e) calculating a mapping relationship between pixel coordinates and module coordinates of the image in the module information processing unit according to the pixel coordinates of the characteristic pattern and the module pixels of the characteristic pattern;
   (f) calculating a module grayscale value in the module information processing unit according to the mapping relationship;
   (g) binarizing the module grayscale value in a binarizing unit;
   (h) extracting a codeword in a codeword extracting unit according to a result of the binarizing step; and
   (i) decoding the codeword in an error correction and decoding unit.

13. The method for decoding a QR barcode of claim 12, wherein the step of searching for the characteristic pattern to obtain the barcode parameter and the pixel coordinates of the characteristic pattern further comprises generating a characteristic pattern detection template according to a module dimension scale of the characteristic pattern, translating the characteristic pattern detection template relative to the barcode image, executing a grayscale matching process to determine an optimal matching position between the characteristic pattern detection template and the barcode image, and determining the pixel coordinates of the characteristic pattern in the barcode image according to the optimal matching position.

14. The method for decoding a QR barcode of claim 12, wherein the step of searching for the characteristic pattern to obtain the barcode parameter and the pixel coordinates of the characteristic pattern further comprises detecting boundary points between dark-colored modules and light-colored modules in the barcode image through scanning, comparing a spacing relationship between the boundary points with a module dimension scale of the characteristic pattern, and determining the pixel coordinates of the characteristic pattern in the barcode image according to the comparison result.

15. The method for decoding a QR barcode of claim 12, wherein the step of searching for the characteristic pattern to obtain the barcode parameter and the pixel coordinates of the characteristic pattern further comprises extracting from a predetermined region of the barcode image a plurality of black-white boundary line segments of a predetermined length, forming a plurality of straight lines from the plurality of black-white boundary line segments, grouping the plurality of straight lines into a row parallel line group and a column parallel line group according to characteristics of parallel lines, identifying a type of the QR barcode by making a determination on a grid formed by the row parallel line group and the column parallel line group and according to characteristics of the QR barcode, and acquiring the pixel coordinates of the characteristic pattern in the grid formed by the row parallel line group and the column parallel line group.

16. The method for decoding a QR barcode of claim 12, wherein the step of acquiring a version parameter and acquiring a module parameter according to the version parameter further comprises extracting version information and format information from the barcode image, and decoding the version information and the format information to acquire a version and format parameter.

17. The method for decoding a QR barcode of claim 12, wherein the step of acquiring a version parameter and acquiring a module parameter according to the version parameter further comprises acquiring the version and format parameter through estimation according to possible formats and possible versions of the QR barcode.

18. The method for decoding a QR barcode of claim 12, wherein the step of searching for the characteristic pattern to obtain the barcode parameter and the pixel coordinates of the characteristic pattern further comprises searching for a first characteristic pattern to acquire the barcode parameter and searching for a second characteristic pattern to acquire pixel coordinates of the second characteristic pattern.

19. The method for decoding a QR barcode of claim 12, further comprising: calculating module coordinates of the second characteristic pattern according to the barcode parameter, the module parameter, and the pixel coordinates of the second characteristic pattern, and calculating the mapping relationship between pixel coordinates and module coordinates of the barcode image according to the pixel coordinates of the second characteristic pattern and the module coordinates of the second characteristic pattern.

20. A method for decoding a QR (Quick Response) barcode in a decoding chip, comprising the following steps of:
  (a) acquiring an image of the barcode from the data storage, wherein the image in the data storage are obtained from a photosensitive array;
  (b) extracting a plurality of black-white boundary line segments of a predetermined length within a predetermined region of the barcode image in a characteristic searching unit;
  (c) forming a plurality of straight lines from the plurality of black-white boundary line segments in a characteristic searching unit;
  (d) grouping the plurality of straight lines into a row parallel line group and a column parallel line group according to characteristics of parallel lines in a characteristic searching unit;
  (e) identifying a type of the QR barcode by making a determination on a grid formed by the row parallel line group and the column parallel line group and according to characteristics of the QR barcode in a characteristic searching unit;
  (f) acquiring the pixel coordinates of the characteristic pattern of the grid formed by the row parallel line group and the column parallel line group, and acquiring a barcode parameter according to pixel coordinates of the characteristic pattern in a characteristic searching unit;
  (g) acquiring a version parameter and using the version parameter to calculate a module parameter in a module information processing unit;
  (h) searching for a correction characteristic in a correction characteristic acquiring unit to acquire pixel coordinates of the correction characteristic;
  (i) calculating module coordinates of the correction characteristic in the module information processing unit according to the barcode parameter, the module parameter, and the pixel coordinates of the correction characteristic;
  (j) calculating a mapping relationship between pixel coordinates and module coordinates of the barcode image in the module information processing unit according to the pixel coordinates of the correction characteristic and the module pixels of the correction characteristic;
  (k) calculating a module grayscale value in the module information processing unit according to the mapping relationship;
  (l) binarizing the module grayscale value in a binarizing unit;
  (m) extracting a codeword in a codeword extracting unit according to a result of the binarizing step; and
  (n) decoding the codeword in an error correction and decoding unit.

* * * * *